Jan. 1, 1935. K. H. WILLIAMS 1,986,615
PROCESS AND MEANS FOR INSULATING THE WINDINGS OF ELECTRICAL APPARATUS
Filed Jan. 5, 1933 3 Sheets-Sheet 2
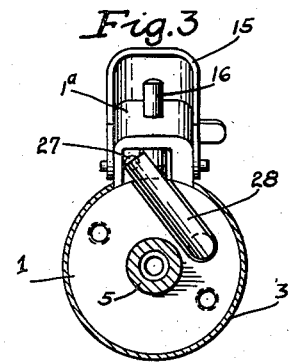
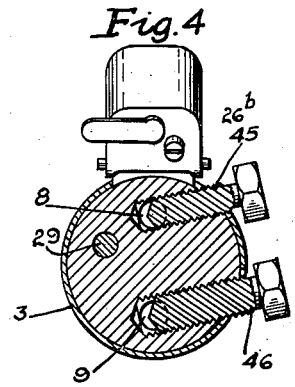
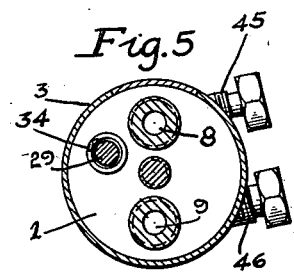
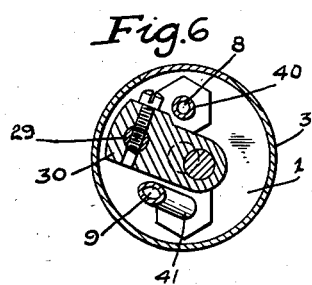
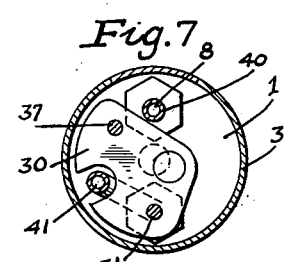
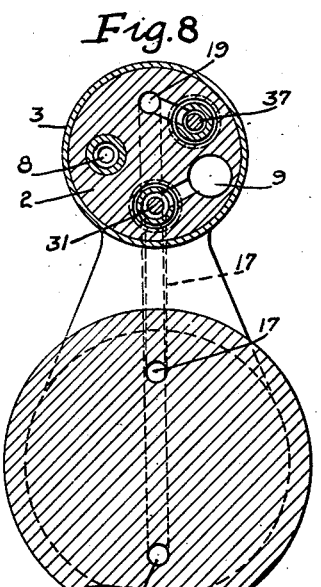
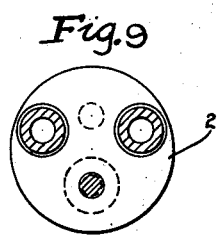
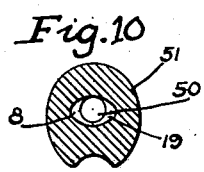
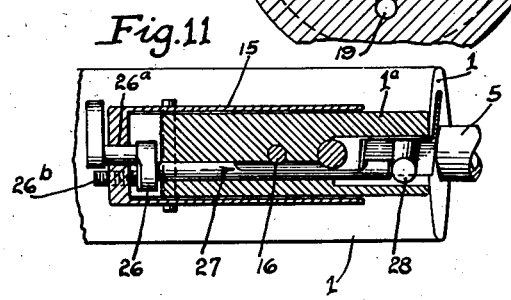
INVENTOR
KENNETH H. WILLIAMS
By *[signature]*
ATTORNEYS

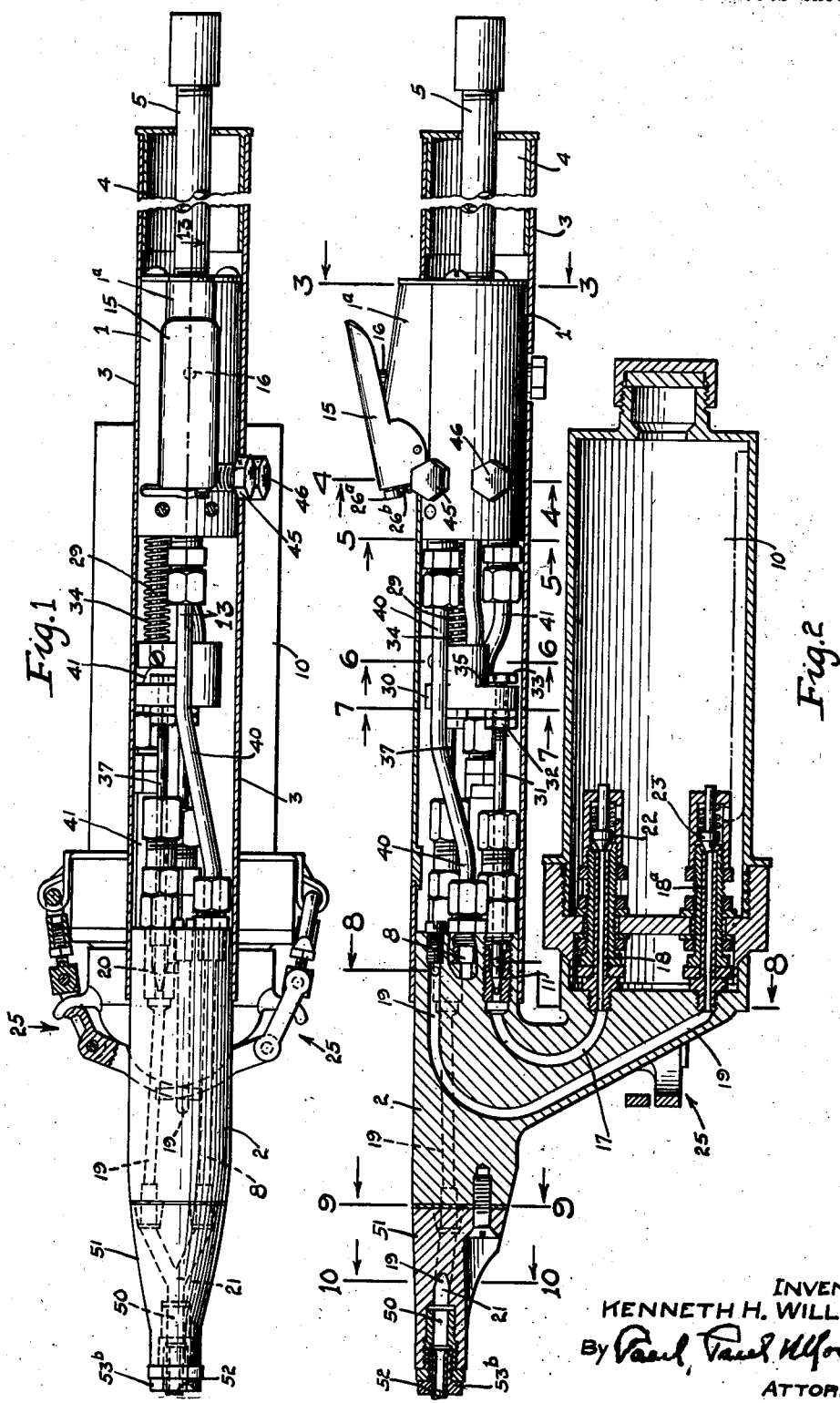

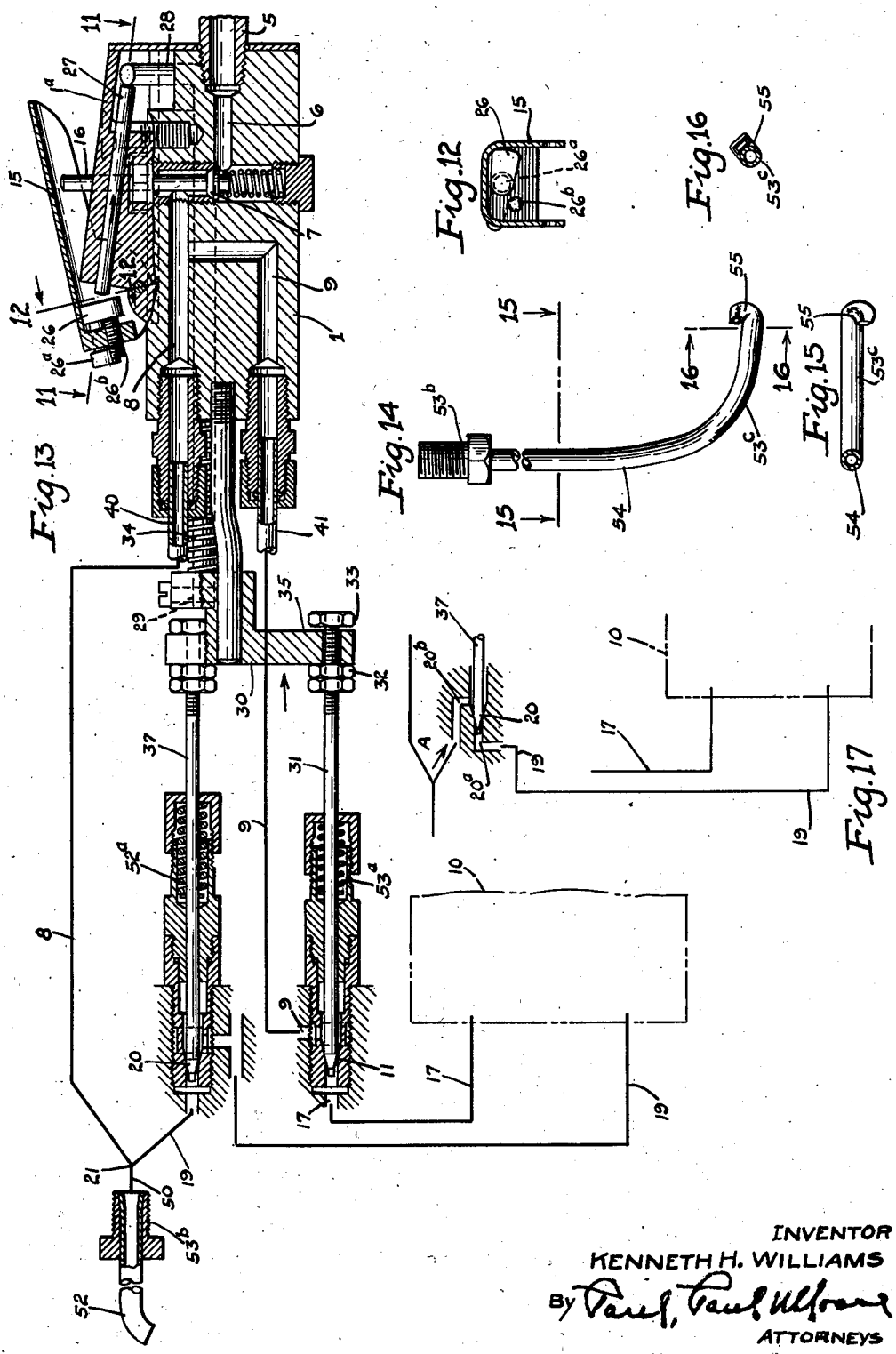

Patented Jan. 1, 1935

1,986,615

UNITED STATES PATENT OFFICE 1,986,615

PROCESS AND MEANS FOR INSULATING THE WINDINGS OF ELECTRICAL APPARATUS

Kenneth H. Williams, Minneapolis, Minn.

Application January 5, 1933, Serial No. 650,304

5 Claims. (Cl. 91—68)

This invention relates to a process and means for reconditioning or re-insulating the coils or windings of motors, dynamos and the like in situ, or otherwise. The invention thus far finds its most valuable application in the treatment, in situ, of motors and dynamos in which the electrical efficiency has been reduced as the result of the general disintegration and cracking off of the original insulation (due to vibratory or other causes) and by the filling of the spaces left by such cracked-off material by substances which short-circuit the windings. It is well known that such short-circuiting results in substantially reducing the electrical efficiency.

The main object herein is to force the reinsulating material between the windings in a manner to stop short-circuiting and improve the appearance of the windings.

In order to understand the economic gains resultant from the practice of this invention, a discussion of the present commercial procedure for re-insulating motors seems advisable. It should be noted, at the start, however, that the present methods can hardly be said to result in re-insulating, but can only be considered to result in a good paint job with not a very noticeable increase in electrical efficiency. Heretofore, when it was necessary to recondition a motor, the motor was dismantled, carried to a shop and there cleaned and repainted, and then returned to the original owners, and again set up or put together.

In order to condition the motor for the application of the old method of separately painting and baking the separated parts of a motor, the leads of the motor are disconnected, the base bolts loosened up, and then the unit is removed from its supports. Sometimes a hoist, skids or blocking are necessary, and it is often necessary to partly disassemble the unit to transport it to a repair shop, or to disassemble it after transportation. In this old practice, the rotor and armature is blocked up, and the stator after being turned on its side is blocked up to a position of accessibility. The parts are then cleaned sometimes by scraping with tools, and then splashing with cleaning fluid of some sort in a haphazard manner. The parts are then dried—sometimes left to dry naturally, and sometimes dried by quicker methods. After drying, the insulating material is applied by brush, or the separated parts are dipped and then baked, and afterwards reassembled. Ordinarily, while the unit is out of service, it is necessary to install a rented unit. For example, in case of a fifty horsepower squirrel cage motor, it was estimated that the machine would be out of service for a minimum of fifty hours, and the cost would be one dollar an hour—fifty dollars. In addition, there would be a rental charge for a substitute motor, of approximately forty dollars. Added to rental charges and disassembly and transportation costs, are the actual costs of cleaning by a time-consuming method.

By the practice of the invention herein, the motor or dynamo or other winding does not have to be removed from its base or dismantled, and the total cost of reconditioning a motor of the size and kind above mentioned, as an example, would not amount to more than ten dollars.

Under the present, or old, practice, the cost of reconditioning a large generator is prohibitive. In the case of a generator, it is questionable whether, by the old method, a proper cleaning and re-insulating job can ever be accomplished without returning the machine to the builders, and this return involves transportation costs, and the machine would be out of a commission for at least thirty days.

The cost of successfully reconditioning an equivalent generator by the method of this invention would be from ten to twenty times cheaper. Moreover, with the present method, motors and generators are reconditioned so that they are as good as new, and in some instances, their electrical efficiency has been greater after treatment than when new.

The main feature of the present invention is the application of insulation material under high pressures, so that it is violently forced between the wires of the winding at the same time displacing any foreign material. Other features relate to the manner of mixing the insulating material with air; the successive application of lean and less lean mixtures of air and insulation material; the use of an air-mixed solvent cleaner as a preliminary to the application of the insulating material; the use of air to force the insulation liquid toward its point of mixture with air; the use of air to force the cleaning fluid toward its point of mixture with air; the structures of the means for applying cleaning fluids, as well as the insulating fluid, and the manner in which the air and liquids are controlled in said means or gun.

Features of the means for carrying out the process include: control of pressure and mixture; control of pressure and mixture with all the control elements operable as the result of movement of a single member, and means mounted thereon and movable therewith; the sequence of opening of the valve, to-wit opening of the through-air valve before the opening of the air passage to the reservoir, and the opening of the passage from the reservoir to the mixing point before opening of the air passage to the reservoir; the interchangeable reservoirs respectively for cleaning and insulating fluids; and the use of a series of pipes or nozzles interchangeable to give access to different and hidden parts of the motors, generators, or similar devices.

Objects, features and advantages of the invention, including process and apparatus, will be set forth in the description of the drawings forming a part of this application, and in said drawings Figure 1 is a top plan view of a high pressure mixing gun, with part of the casing in section;

Figure 2 is a longitudinal vertical section with some of the parts in elevation, with the valves of the fluid reservoir open, against the action of their closure springs;

Figure 3 is a detail transverse section on line 3—3 of Figure 2, viewing the end of the lever-controlled plunger;

Figure 4 is a section on line 4—4 of Figure 2, illustrating the valves for additionally controlling and varying the volume and/or speed of the air after entry past the main valve;

Figure 5 is a section on line 5—5 of Figure 2, showing the relations of the tubes which connect the front and rear blocks;

Figure 6 is a section on line 6—6 of Figure 2, illustrating the valve control yoke;

Figure 7 is a view on line 7—7 of Figure 2 further illustrating the position of the yoke to the air tubes;

Figure 8 is a section on line 8—8 of Figure 2, illustrating the relation of the passages in the front block;

Figure 9 is a section on line 9—9 of Figure 2, showing the separable tip piece for the front block;

Figure 10 is a section on line 10—10 of Figure 2, through the tip piece;

Figure 11 is a plan section through the rear block control lever, and related parts, taken on line 11—11 of Figure 13;

Figure 12 is a detail section further illustrating the control lever and related parts, taken on line 12—12 of Figure 13;

Figure 13 is a somewhat diagrammatic section illustrating the relation of the passages to the control lever, and auxiliary valves, the control lever portion of the figure being a vertical section taken substantially on line 13—13 of Figure 1;

Figure 14 is an elevation of one of the interchangeable nozzles or pipes which give access to different and hidden parts of motors or generators;

Figure 15 is a plan section on line 15—15 of Figure 14;

Figure 16 is a vertical section on line 16—16 of Figure 14; and

Figure 17 is a detail illustrating a modification of the passages leading to and from that valve which controls ejection of the insulating fluid from the reservoir to mixing point.

A preferred form of means for controlling the fluids and their mixture, and their pressure application in accordance with the process herein, has been illustrated and claimed. This means is designed to apply under high pressure, air alone, or air mixed with cleaning material, or air mixed with insulating material, and is further designed to separately control the entry of compressed air into a container for cleaner, or into a container for insulating fluid. The device is further designed to separately control entry of air into the container or reservoir, and the ejection of the air and container-liquid toward the mixing point. It is further designed for adjustment to obtain different pressure and/or volume ratios in the two air lines, after entry of the compressed air past the main control valve, and before entry into the supply chamber, for cleaner or insulating material.

*Means for controlling the process*

The drawings illustrate a device particularly designed for carrying out the process of this invention, and the device is illustrated herein because the proper application of the fluids under high pressure depends largely on their careful and proper control. The object is to provide means whereby high pressure control of air mixing and discharge of cleaning fluids, and of insulating fluids can be accurately controlled both as to relative quantity and degree of pressure.

The operation of the device is best understood from Figure 13 which is a semi-diagrammatic view in which the control end of the gun is shown in substantially true vertical section on line 13—13 of Figure 1, and in which the arrangement of the valves for controlling entry of air into the fluid-containing chamber and exit of fluid from that chamber are shown diagrammatically.

The rear end of the device includes a cylindrical metal block indicated at 1, and a forwardly arranged block or casting 2, the two blocks being spaced in an axial direction and being connected by a sleeve 3 which extends rearwardly of the block 1. This sleeve is capped by element 4 which is removable, and through this cap extends the main supply pipe 5 communicating with passage 6 of the block 1.

Air under pressure enters the passage 6 past the valve 7 and into passage 8 which leads forwardly directly to the discharge nozzle of the gun. Passage 9 branches from passage 8 and leads into tank 10 past valve 11. Main valve 7 is opened by engagement of lever 15 with the stem 16 of valve 7.

Valve 11 controls entry of air from passage 9, into passage 17 (see Figure 13) in head 2, which latter passage leads into the tank 10 through a tube 18. The tube also acts as means for opening and holding open a valve of removable tank 10 in a manner to be described. Exit of liquid from tank 10 is through valve-control tube 18ᵃ and passage 19. Passage 19 is controlled by valve 20 (see Figure 13) arranged between the tank 10 and the meeting point 21 of passage 19 with passage 8.

There are ordinarily two tanks 10 used (only one of which has been shown) and each tank is equipped with valves respectively indicated at 22—23, which are opened and held in open position respectively by tubes 18—18ᵃ, see Figure 2. As soon as the tank is removed, these spring-controlled valves automatically close to prevent loss of liquid and air from the tank. The tank is held in operative position by suitable releasable fastening means generally indicated at 25.

A feature of the present device, which is closely related to the present process, concerns the control by a single lever 15, of valves 7, 11 and 20 so that one hand is free to guide the elongated spout or nozzle to, and hold said nozzle in, operative position, against the high pressure which tends to deform it.

It is to be noted that as at present designed, the bore of the elongated nozzle 51 is of less area than the sum of the areas of passages 8 and 9. As the result of this arrangement, and because of the fact that the heavy insulating fluid sometimes coagulates in the elongated tube, an unusual back pressure is set up against valve 20, particularly when air alone is being blown for cleaning or drying purposes. Of course, there is no intention to limit the design in this manner, but in order that the gun may be designed in this manner, and in order that with such a design, valve 20 may be properly kept closed against back pressure, a stronger spring 52 is provided for seating the valve 20 than is provided for seating the valve 11. In Figure 17 a modification of the passages, leading to and from the valve 20 has been illustrated, and reference is later made to this modification.

The control is such that valve 7 may be opened independently of the valves 11 and 20 by a slight adjustment of a member carried by the lever 15, which member is indicated by the numeral 26, see Figures 4, 11, 12 and 13. When the member is in the position shown in Figure 11, and upon depression of lever 15, rod 27 is moved rearwardly in the direction of the arrow to the position shown, whereby the rod engaging the turned end 28 of a slide rod 29, see Figures 1 and 13, moves it in the corresponding direction to operate the valves 11 and 20.

Referring to Figure 11: It is seen that member 26 is journaled as at 26ª in an end wall of the lever 15 which wall is spaced from the end of the block 1ª, secured to the block 1, so that a kind of a housing chamber is formed for the element 26. The journal 26ª is translatable. The position of the element 26 in an axial direction is adjustable by means of a screw 26ᵇ and by this adjustment the degree of translation of the element 27 can be also varied and, therefore, the degree of translation of slide rod 29, and correspondingly the degree of opening of valves 11 and 20. Of course, a finger piece, operable by the thumb, when the fingers are gripping the barrel 3, is provided on the journal 26ª. This adjusting arrangement, in combination with the means 45—46 (see Figure 4) for controlling the volume and/or velocity of the air in the passages 8 and 9 form valuable features of this invention, in regard to accuracy and the ability to vary the conditions of discharge and of mixture.

By reference to Figure 11, it will be noted that element 26 is beveled so that as it is swung from position shown in Figure 12 to that shown in Figure 11, the beveled portion engages the set screw 26ᵇ and the result is that the journal 26ᵇ is translated in direction of the arrow so that the parts assume the operative position shown. When the screw 26ᵇ is screwed farther inwardly, to obtain a different adjustment, the bevel acts in the same way and the element 26ª is translated a little farther in direction of the arrow. Conversely when the screw 26ᵇ is moved outwardly the degree of translation of the journal is correspondingly lessened, and its relation to the end of the rod 27 is changed so that on depression of lever 15, rod 27 will not move as great a distance. By this means, the degree of motion of the valves 11 and 20 can be varied. A valuable feature.

When the element 26 is in the position shown in Figure 12, depression of the lever 15 does not operate the valves 11 and 20, but only the valve 7, so that a straight-through blowing of air can be had, as for cleaning and drying purposes.

Another feature of the invention is the operation of valves 11 and 20 so that valve 20 is opened, before valve 11. Opening of one valve before the other is obtained by means of what may be termed a yoke piece or connection 30.

This yoke is best shown in Figure 13. Rod 29 is connected to this yoke. A lost motion connection between this yoke and the valve 11 is provided by means of a rod 31, the outer end of which forms part of the valve structure. Adjustable upon rod 31 are stops 32—33 so arranged that when the rod 29 and yoke are moved rearwardly by rod 29 against the action of spring 34, the rear surface 35 of yoke 30 engages rear stop 33 after valve 20 is fully or partly opened.

Valve 20 is in part formed and controlled by rod 37 attached to the yoke 30. This rod is also provided with means for adjusting it axially with respect to the yoke 30, and a lost motion connection with the yoke may be had, although not shown in the drawings. On motion of the yoke 30 in direction of the arrow in correspondence to the movement of the rods 27 and 29, valve 20 will be opened before valve 11, and on reverse movement of the yoke, valve 11 will be closed after valve 20. In this embodiment, passage 8 between the block 1 and head 2 is conveniently formed by means of a pipe 40 suitably sealingly secured respectively to blocks 1 and 2. The passage 9 leading to the valve which controls entry to the tank is formed by a pipe 41 suitably secured.

Another feature of this device relates to the means best indicated in Figure 4 for varying the pressure and/or volume ratios in passages 8 and 9, after the air has passed the main valve 7. The calibre of passage 8 is controlled by a threaded valve member 45, and the calibre of the passage 9 by a similar valve member 46.

The air, or the mixed air and liquid, is finally delivered into a passage 50 in a tip piece 51, see Figure 2, which tip piece is detachably secured to block 2. Detachably secured to the tip piece and forming an extension of the passage 50 is a spout or nozzle 52. There are a number of these spouts ordinarily used. Only two styles have been shown, one in Figure 13, and another in Figures 14 to 16, inclusive. The use of elongated spouts is for the purpose of reaching hidden parts of the coils without dismantling the motor or like device, so that pressure-cleaning and pressure application of the insulating material may be facilitated without the expense of dismantling the unit. The use of these elongated tubes requires a specially constructed gun. When it is remembered that air is blown through the tube under very high pressure, and when it is remembered that the tubes at times may be partly clogged by the heavier insulating material, it is evident that back pressure is often set up which tends particularly to open the valve 20. To prevent this opening by back pressure, the valve 20 is held in its seat by a relatively strong closure spring 52ª. The valve 11 is also provided with a closure spring 53ª which need not be as strong as the spring 52ª. Each pipe 51 is provided with means indicated at 53ᵇ for detachably connecting it with the passage 50.

In Figures 14 to 16, inclusive, a special form of pipe has been shown, and this is a feature. The pipe has a portion 53c which lies substantially at right angles to the portion 54, the pipe being curvedly bent as shown. The terminal of the portion 53c is turned backwardly upon itself, as indicated at 55, and this backturn lies laterally of a plane which passes through the portions 53c and 54. This relation is best shown in Figures 15 and 16. A feature of the process is the ability to high-pressure-apply insulation to the coils of the motor or generator, in situ, without dismantling the same.

The spray tube shown in Figures 14, 15 and 16 permits the operator to get under, and to blow upwardly and/or laterally, and to pressure-apply the cleaning fluid to the laminations of the outcoming leads of the armature of a D. C. motor.

An objection to taking down the motors is that the alignment is not the same after reassembly especially on silent chain drive type.

In the gun above described, the pressures in the straight air and in the cleaning or insulating fluid lines can be varied to correspondingly vary the force of delivery, and these can be regulated according to a certain standard of the amount and force of delivery necessary. Thus any given proportion of air and material may be had, with the supply air pressure constant. The present device also provides means whereby the entire control is by one hand, that is control of the air from the source into the device, and alternate control of the air thereafter, either for an air blowing or cleaning operation, or for a liquid cleaning operation or for mixing insulating fluid with air. It will, of course, be understood that the insulating fluid is applied to the wires, and that fills the spaces between one cotton covering and another, as well as between bare or partly bare wires.

In Figure 17 is shown a modification, previously referred to, of the arrangement of the passages leading to and from valve 20, for the purpose of positively preventing opening of the valve 20 by back pressure due to conditions in the nozzle 52, or other substitute nozzle, like 54. In this case, the passage 19 leads to the valve 20 at a point forwardly of the valve seat, as indicated at 20ª, and after passage through the valve the liquid is led outwardly toward the mixing point through a passage 20ᵇ which is arranged rearwardly of the valve seat. By this arrangement, it will be seen that any back pressure in direction of the arrow A would not result in opening valve 20. This is a valuable feature and this means or means equivalent to spring 52 are claimed herein as means for preventing back pressure into the tank when blowing air.

If valve 20 opens during an air blowing operation when it is not desired to have any liquid of any kind applied, some liquid would be mixed with air and applied because of the residual pressure in tank 10. This is due to the fact that valve 11 closes after valve 20, while valve 7 is open and, therefore, while there is pressure in those portions of passages 8 and 9 which are rearwardly of the valves 11 and 20.

*Process*

Steps of the process include: (1) Cleaning under relatively high pressure and (2) applying insulating fluid under relatively high pressure in a manner to displace the cleaning fluid and cause the insulating material to thoroughly cover and insulate the surfaces.

The procedure is as follows: The bonnets are loosened up, the end bell is removed on that side opposite the pulley. All foreign matter and dirt is blown out with air under relatively high pressure. This blowing mechanically removes broken insulation and other foreign substances such as dust and dirt, as well as some oil.

When performing this air-blowing operation, the element 26 is in the position shown in Figure 12 and, therefore, on depression of lever 15, valve 7 only is opened, and air is forced through passage 8 into the nozzle 52. Tank 10 containing cleaning fluid being in operative position, the element 26 is after the blowing operation, moved to the position shown in Figure 11, and upon depression of the lever 15 cleaning fluid is forced from the tank and mixed with air at point 21.

All the surfaces are now washed or cleaned with gasoline or other cleaning fluid as a solvent in a mixture of about ninety per cent of air to ten per cent of the cleaner. This removes substances not mechanically removable by the first step. This cleaner is forced between the coils to all exposed and other wire, and under high pressure. After this thorough washing to remove any lubricating oil which might thin out the insulating material when it is applied, the surfaces are dried by air blowing or otherwise, the operator feeling with the fingers to see if all cleaner and foreign matter is removed. This drying is accomplished by blowing air only as the result of depression of lever 15 with the element 26 in the position shown in Figure 12. A tank 10 containing insulating fluid is now connected with the blowing and mixing system and the element 26 is moved to the position shown in Figure 11. The insulating material is now applied under high pressure preferably not below one hundred pounds per square inch. The first application consists of a lean mixture of the material, about eighty per cent of the air to twenty per cent of insulating material. In his operation, the insulating material may be said to be violently driven between the windings, and even into the interior surfaces of the coils. Apparently any foreign material, such as broken residual insulation and oil, remaining after the previous treatments, is driven out or displaced by this high-pressure-applied insulating material. In the case of insulating material which has become porous, the high pressure application of insulating material fills the pores. This thin coating or lean mixture is then allowed to set, while the operator proceeds to treat the opposite end of the motor and apply a lean mixture of material thereto.

It is here noted that under some conditions, the high pressure application of the insulating material alone, without previous cleaning, may be accomplished and therefore the single step of high pressure application of insulating material is claimed.

The operator now comes back and applies another coating of insulating material in proportion of about fifty parts of air to fifty parts of insulating material, and continues application until a smooth shiny surface results. The opposite end of the job is completed in the same manner and the material is then allowed to set for about thirty to forty-five minutes.

The best results for all-around purposes thus far seem to be obtained by using pressure of one hundred twenty-five pounds per square inch or over, and as high as two hundred pounds, which higher pressures are particularly effective with a lean mixture of air and insulating fluid. The pressure is figured as it issues from the nozzle of the gun. Of course, the time element is important, and for all purposes, one hundred twenty-five pounds per square inch or over seems to be the best. Experiments seem to indicate that the job can be accomplished at pressure below one hundred twenty-five pounds but at present it does not seem that proper work can be done at pressures below twenty-five. The forceful driving pressure is necessary to displace oil films and broken insulation and this displacement is necessary so that proper covering of the metal of the exposed wires may be had. The process is essentially a high pressure cleaning and insulation-applying one.

The present high pressure displacement method has been found to displace oil even where the parts are soaked with it, and in displacing this oil, all water or other moisture is driven out as well as the metal or mineral or vegetable substances which result either from degeneration due to electrical or chemical effects or from mechanical effects. Sometimes such substances are floated in by the oil, but the present method removes all foreign substances, and the penetrative high pressure application of the insulating material results in some instances in a very much improved insulating ability over that of the motor when it was new. In some instances, the motor runs fifty percent cooler after treatment by this process than before.

It is further noted that unless relatively high pressure is used, impurities such as oil and greases, cannot be driven out. This is also true for water and for any metal or mineral or vegetable substances which may have been floated in by the oil. The thorough removal of these substances is an important object accomplished by the present high pressure method of operating and to the extent that these foreign elements are moved and to the extent that the insulating material is thoroughly incorporated, to that extent only is the efficiency of the motor restored or increased.

Insofar as I am aware, no one has ever experimented sufficiently to discover that high pressure is necessary in order to force the old material out, but particularly in order to force insulating material in, and to thoroughly displace foreign material. It does not appear that anyone before this invention has been able to increase the efficiency of a motor over that of a new motor by any reconditioning process.

It may be aptly said that in the procedures used before this invention, the operation was to blow dirt off and apply the material in a haphazard fashion, in the hope that at least the original efficiency of the motor would be restored.

I claim as my invention:

1. The method of reconditioning electrical mechanism including coils and without dismantling, which consists in applying by portable mechanism an electrical insulating medium in a fluid state and under pressure high enough to cause said insulating medium to penetrate into the spaces between turns of said winding and thereby fill all voids and insulate each turn of said winding from adjacent turns, and then solidifying the insulating medium thus applied.

2. The method of reconditioning electrical mechanism including coils and without dismantling, which conststst in first applying by portable mechanism an electrical insulating medium in a fluid state of relatively thin consistency and under pressure high enough to cause said insulating medium to penetrate into the spaces between turns of said winding and beneath successive layers thereof, and thereby insulate each turn of said winding from adjacent turns, then solidifying the medium thus applied, and then applying additional insulating medium of thicker consistency and under pressure high enough to cause said medium thus applied to penetrate the turns of the winding and fill all voids therein, and finally solidifying the insulating medium thus applied.

3. The method of reconditioning electrical mechanism including coils and without dismantling, which consists in applying by portable mechanism a fluid under high pressure to the winding to remove all broken and loose particles of the former insulation and dust and other foreign matter without disturbing the turns of said winding, then applying an electrical insulating medium in a fluid state of relatively thin consistency and under pressure high enough to force said medium into spaces formerly occupied by the insulation that has been removed and thereby insulate each turn of said winding from adjacent turns, then solidifying the insulating medium thus applied, then applying additional fluid insulating medium of a thicker consistency to the winding under pressure high enough to force said medium into and fill all voids between successive layers and turns of said winding, and finally solidifying the medium thus applied so that the turns of said winding are embedded in a solid mass of insulating material.

4. The method of reconditioning electrical mechanism including coils and without dismantling, which consists in first removing all broken and loose particles of the former insulation and foreign matter without disturbing the turns of said winding, then applying by portable mechanism to the winding an insulating medium in a fluid state and under pressure high enough to force said medium into all voids between successive layers and turns of said winding to insulate each turn from adjacent turns of said winding, and then solidifying the insulation thus applied so that the turns of said winding are embedded in a solid mass of insulation.

5. The method of reconditioning electrical mechanism including coils and without dismantling, which consists in first removing all loose and broken particles of the former insulation without disturbing the turns of said winding, then removing oil, grease and other foreign materials from the winding without disturbing the turns of the winding, then applying by portable mechanism a fluid electrical insulating medium to the winding under pressure high enough to force said medium into all voids between successive layers and turns of said winding and thereby insulate each turn of said winding from adjacent turns, then solidifying the insulating medium thus applied, and then applying successive coats of said insulating medium until all spaces are completely filled therewith and the turns of said winding are embedded in a solid mass of insulating material.

KENNETH H. WILLIAMS.